3,024,771
CONTROL SYSTEM FOR MOVABLE MEMBERS
Melvin E. Criffield, Cincinnati, and Frederick W. Weissborn, Jr., Green Hills, Ohio, assignors to General Electric Company, a corporation of New York
Filed Apr. 15, 1960, Ser. No. 22,533
3 Claims. (Cl. 121—40)

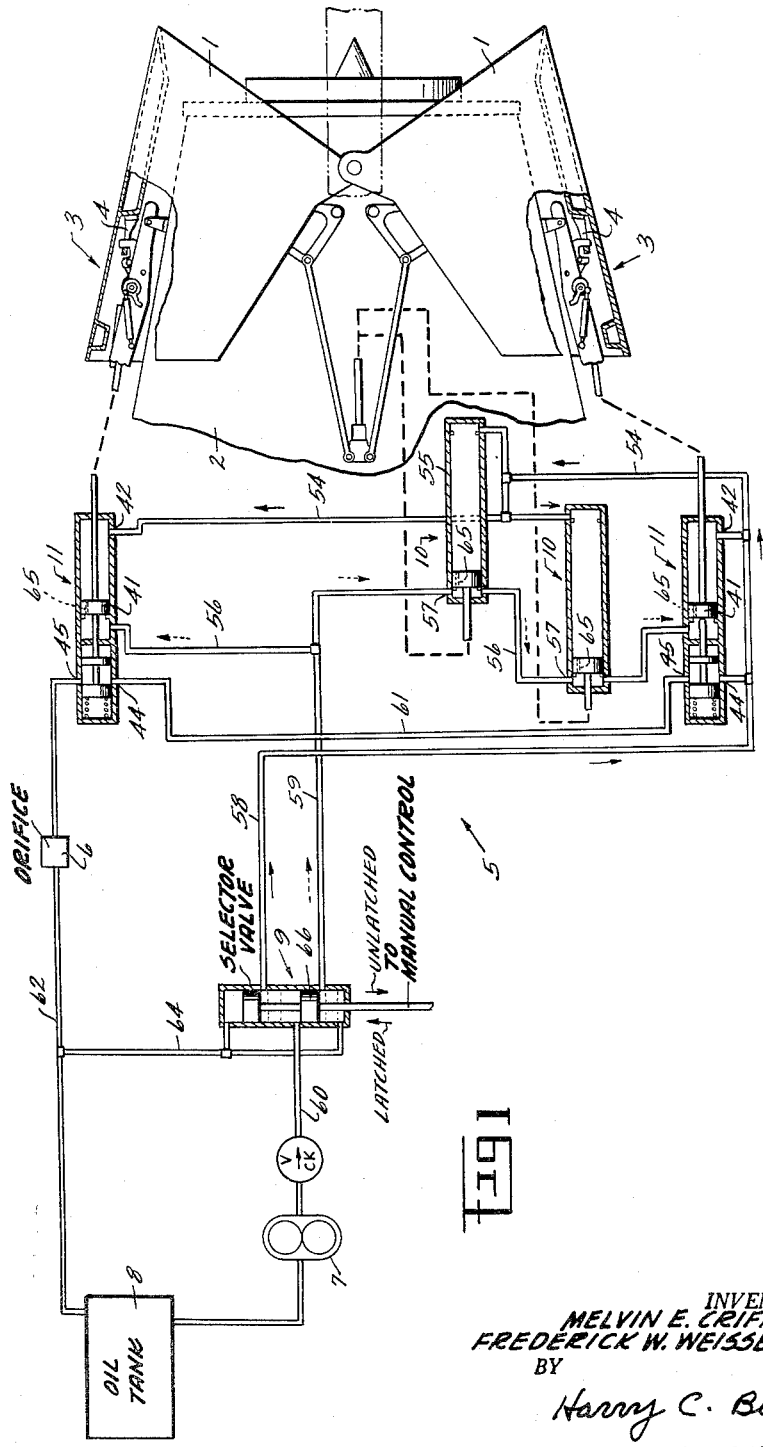

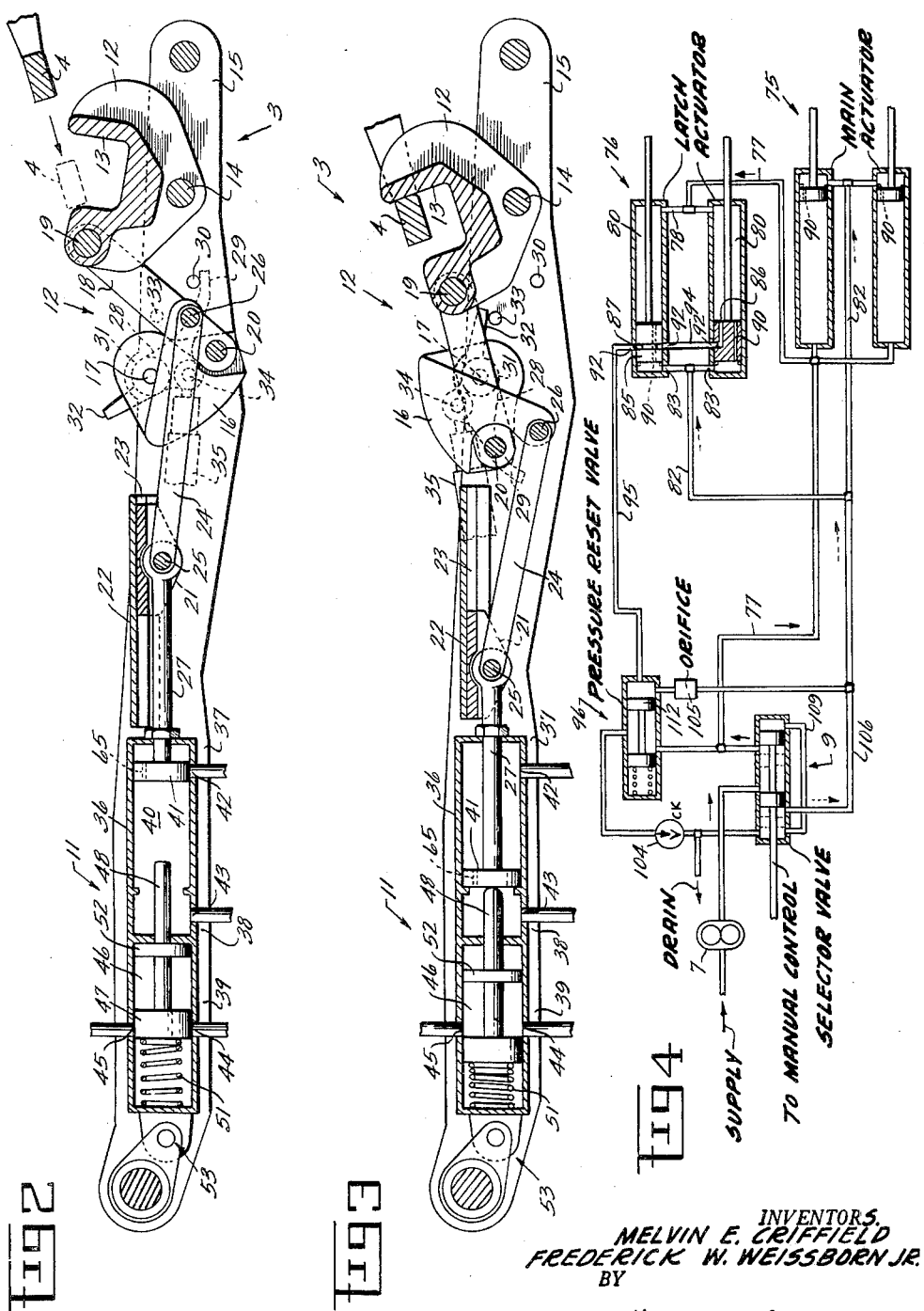

This invention relates to a control system and, more particularly, to a control system and latch apparatus for cycling movable members from a first position to a second position, and back to the first position, the latch apparatus securely holding the members in one of said positions.

As the speeds at which jet engine powered aircraft operate have risen, it has become increasingly important to provide means to assist in slowing down the aircraft, particularly during the landing roll. One means has been to provide on the rear of the engine housing movable members, usually in the form of a pair of blocker doors, which are pivotable into the jet exhaust stream to divert the stream in a generally sideward and forward direction. A control system, usually hydraulic, and mechanical linkage means may be used to activate the members. A prerequisite of such a control system and linkage mechanism has been means whereby the movable members can be securely held in the stowed or forward thrust position, for obvious reasons of safety. Further, it is necessary that the control system which moves the members from the unlatched or reverse thrust position to the stowed position, and back again, be timed either by the moving members or by the latch mechanism itself. This is necessary in order that it be assured that the latch mechanism is in a position to receive the members so that there is no possibility that the members will not be securely latched. In addition, it would also be desirable, once the members are securely latched, to reduce or relieve the pressure in the control system to a level less than that needed to hold the members in the latched position. This latter feature is to minimize wear in the control system and reduce the average power consumption, particularly when it is a hydraulic system and the movable members are used in an aircraft thrust reverser. Known control systems and latching mechanisms, however, usually have involved relatively complicated mechanical linkages, including, e.g., pawls or pins which have to be removed to release the members. The control system actuators in such systems are timed, if at all, by means of separate limit switches or synchronizing linkages which act to stop the latching operation at the proper time. With such a system similar relatively complicated devices are required to relieve hydraulic pressure at the completion of the latching sequence. Obviously, the more complicated the system is, the greater the chances of failure of parts causing unsafe operation, to say nothing of the cost of the system, and in airborne applications safe operation must be considered a primary design factor.

Accordingly, an object of our invention is to provide a safer, more positive, less complicated and more easily manufactured control system and latching mechanism for use with movable members.

A further object of our invention is to provide an improved control system and latching mechanism for use with an aircraft jet engine thrust reverser having a pair of movable jet diverting members.

Another object of our invention is to provide a more positive latching apparatus and mechanism in combination with a control system for use with an aircraft jet engine thrust reverser having a pair of movable jet diverting members, the mechanism acting to time the operation of the control system.

A further object of our invention is to provide a more positive latching apparatus and mechanism in combination with a control system for use with an aircraft jet engine thrust reverser having a pair of movable blocker doors whereby the doors will be latched only upon a signal from the mechanism being applied to the control system.

Another object of our invention is to provide a more positive latching apparatus and mechanism in combination with a control system adapted to operate a pair of movable members utilized in a jet engine thrust reverser, the mechanism acting to time the system so that when the members are securely latched system power will be reduced.

A further object of our invention is to provide an improved control system for use with a movable member, the system including a member engaging mechanism which automatically begins the engaging sequence on initial contact with the member moving towards a securely engaged position, a power supplying means subsequently taking over on a first signal from the mechanism to move the member to the securely engaged position, whereupon a second signal is supplied to the power supplying means to lower the power level.

Briefly, one embodiment of our control system for use with movable members comprises a first motor means for moving the members, a latch mechanism operable to engage the member when it has been moved into contact with the mechanism, second motor means connected to the mechanism to cause it to securely engage the member, linkage means in the latch mechanism to signal the second motor means that the member is in contact with the mechanism, detent means for maintaining the latch mechanism linkage means in the latched or unlatched position, means to supply a power reducing signal to reduce power being supplied to the first and second motor means when the member is securely latched, and means to maintain the control system power at the desired level for latching, unlatching or steady-state operation.

Other objects and advantages of our invention will become more apparent and better understood when the specification is read in connection with the following drawings in which:

FIG. 1 is a schematic diagram of one embodiment of our novel control system and latch apparatus used with a pair of aircraft jet engine thrust reverser blocker doors; and FIG. 2 is a side elevation, partially in cross section illustrating one embodiment of the latch apparatus in the unlatched position; and FIG. 3 is a side elevation of the apparatus shown in FIG. 2 in the latched position; and FIG. 4 is a schematic diagram of a further embodiment of main control system portion of our invention including a portion of the latch apparatus.

Referring now more particularly to FIG. 1, the invention is shown being utilized to control and maintain the position of a pair of pivotally interconnected thrust reversing members or blocker doors 1—1 mounted on the rear end of an engine housing or nacelle 2. The doors are depicted in the stowed or forward thrust position, being securely held there by means of the latch apparatus and mechanism, indicated generally at 3, being engaged with retaining members or stirrups 4 on each door. The doors are caused to move to and from this position by means of a control system including, in this case, a hydraulic power system, indicated generally at 5. The system includes means 6 to help reset system power or pressure, a pressure supplying device 7 (e.g., pump), a fluid reservoir or tank 8, a selector valve 9, main actuators 10, and suitable lines or conduits.

FIGS. 2 and 3 illustrate an embodiment of our novel latch apparatus and linkage mechanism for unlatching and latching the movable members or doors and holding them in the latched position, including an arrangement for signalling the main control system when forward thrust operation is first initiated and also when the doors are securely latched. It will be understood that each latch apparatus is identical so only one will be described. As shown in the unlatched position, in FIG. 2, the apparatus comprises motor means or latch actuator 11, and a mechanical linkage portion indicated generally at 12 for positively engaging the door stirrup 4, on a signal from the door, and for disengaging it when operated by the latch actuator 11. The mechanism, preferably located on the vertical center line of the door to obtain maximum mechanical advantage, includes a member or catch 12 having a lip 13 arranged to positively engage the door stirrup to hold the door securely in the latched position. The catch is pivotally mounted at 14 to a frame 15 which, in turn, is adapted to be securely fastened to the engine housing, as shown in FIG. 1. Also mounted on the frame is a position translating member or crank 16. The crank is arranged to rotate on the frame about a pivot point 17 forward on the frame of the catch pivot point 14. The two pivotable members are joined by a rigid connecting link 18, pivotally attached to the catch at 19 and to the crank at 20. To operatively connect the crank to the latch actuator, means may be provided to insure that the latch actuator rod end moves in a straight line so as to preclude the possibility of binding or twisting. In the embodiment shown in FIGS. 2 and 3, this latter means comprises a movable member or slider 21 which slides on a supporting member or track 22 mounted on the frame 15 by suitable brackets 23. The track is arranged generally parallel to the frame, as can be seen in the drawing. A push rod or link 24 is pivotally connected to the underside of the slider at 25 and to the crank at 26. One end of the latch actuator rod 27 is also connected to the slider at 25; thus straight line movement of the actuator rod end will be transmitted to the position translating member 16.

To enable the latch mechanism to maintain the member 12 in a latched or in an open, i.e., unlatched position, suitable linkage detent means are provided. In the embodiment shown in FIGS. 2 and 3, the crank 16 is provided with a first cam member 28 arranged to turn with the crank. The member 28 is mounted so as to clear the side of the frame, as the crank turns, and includes a dog 29 adapted to contact stop means 30, projecting from the side of the frame, so as to prevent further unlatching movement, as will be described more fully below. The crank is also provided with a second cam member 31 which turns with the crank. This second cam member includes a dog 32 adapted to contact stop means 33 on the frame to prevent further movement in the latching direction. The first and second cam members preferably are located on opposite sides of the frame 15, although this is not necessary. Pivotally attached at 34 to the cam member 28 is a toggle or detent spring actuated cylinder 35. The other end of the cylinder is secured to the frame, as shown in FIG. 1. The toggle or spring actuated member 35 is arranged to exert force on the crank through cam member 28 to hold dogs 29 or 32 against stops 30 or 33, respectively, depending on whether it is desired to hold the catch 12 in a door receiving position or a door securing position, also respectively. Obviously, other means could be substituted for the exact detent means shown, such as camming the crank member itself and providing, say, a plunger to act directly on the crank which would then rotate between suitable stops on the frame, or any other suitable force exerting means.

An embodiment of the latch actuator portion of our novel latch apparatus motor means is also illustrated in FIGS. 2 and 3. In FIG. 2, i.e., the unlatched position, the actuator includes a cylindrical housing or body 36 having a latching pressure or rod end 37, a head or unlatching pressure end 38 and servo valve portion 39. Riding within a hollow bore 40 is a power piston 41 which is attached to the other end of the actuator rod 27. Adjacent the rod end 37 of the latch actuator is a port 42 opening into the bore 40. At the head end 38 of the actuator is a second port 43 also opening into the bore 40 but on the opposite side of the power piston from the first-mentioned port. In the servo valve portion of the actuator are a pair of ports 44 and 45 which are arranged in line with each other to provide flow straight through a bore 46. A second or servo piston 47 is positioned on a rod 48 which moves in the bore 46, in unison with the first-mentioned piston 41, servo piston 47 being operable to close or open the ports 44 and 45 simultaneously. Spring means 51 is provided to cushion the actuator and maintain the servo valve in the closed position in the absence of a signal from the power piston. A guide piston 52 may also be provided, although this is not absolutely necessary. The actuators are secured to the frame 15 at 53 by a suitable fastening arrangement.

Referring again to FIG. 1, which includes a schematic diagram of the main portion of the hydraulic control system employed to move the blocker doors, we will now describe how the apparatus of FIGS. 2 and 3 combine with the rest of the system to achieve the novel results claimed for in our invention. In the embodiment shown in the drawing the rod or latching pressure end inlet ports 42 on the motor means 11 are connected by a first conduit means 54 to head ends 55 of another motor means consisting of two main actuators 10. A second conduit means 56 connects the head end ports 43 of the latch actuators to the rod ends 57 of the main actuators. The latch actuator rod and head end conduit means 54 and 56, respectively, are also connected to the selector valve 9 through conduits 58 and 59, respectively. The selector valve is arranged to operate in response to movement of a manual control lever (not shown) by the aircraft pilot. Preferably the selector valve is linked to the throttle to control the air speeds at which the blocker doors will be activated towards the reverse thrust position. The pump 7 supplies high pressure hydraulic fluid from the tank or reservoir 8 to the selector valve by conduit means 60. Servo valve ports 44 and 45 on the latch actuators are connected in series by conduit means 61 with the servo valve or pressure reset flow path consisting of conduit 58 from the selector valve, ports 44 and 45 on one actuator, conduit 61, ports 44 and 45 on the other actuator, conduit 62, orifice 6, and back to the pump through the reservoir. The orifice 6 is provided in conduit 62 for the purpose of maintaining system pressure even in the vented or relief mode of operation, as described below.

Operation of the control system and latch apparatus above described is as follows: Assuming the movable member to be in an unlatched position, to move the member to the latched position the manual control is moved in the desired direction to activate the selector valve. When this occurs, piston 66 in the selector valve is moved to the position shown in solid lines in the drawing to allow high pressure to be simultaneously supplied through conduits 58 and 54 to the head ends 55 of the main actuators (as shown by the solid line flow arrows) and the rod ends of the latch actuators. However, at this point the latch actuator pistons 41 are blocking off the rod end ports 42 due to the latch mechanism being held overcenter in the unlatched position, as described more fully below. The latch actuators, therefore, do nothing. As high pressure continues to be applied to the head ends of the main actuators, the movable member 1 continues to pivot until the retaining member 4 contacts the member 12, as shown in FIG. 2. The sequence in each latch mechanism then is as follows: Continue movement of the movable member 1 causes the catch 12 to pivot about point 14 on the frame 15. As the catch pivots, point 19 on the catch moves in a counterclockwise direction. Since this point is connected to point 20 on the position translating member 16 by rigid link 18, point 20 is also required to move. As shown in FIG. 2, the crank will pivot about fixed point 17 on the frame in a clockwise direction due to the location on the crank of the moving point 20 to which the link is attached. As the crank moves in the clockwise direction, point 26, also on the crank, also moves in a clockwise direction, thus moving push rod 24 against the slider 21. The slider therefore moves towards the actuator, or to the left, in the drawing. As can be seen from FIG. 2 the arrangement of the linkage just described is such that after a relatively small amount of travel, latching pressure port 42 is uncovered. Now, high pressure fluid in conduit 58 is allowed to flow into bore 40 and against the rod end side of piston 41. The main hydraulic control system then takes over and continues to cause rotation of the member 12, which is now engaged with the door stirrup. Thus, it is evident that the apparatus just described will effect a timing of the operation of the latch mechanism by a signal or initial push from the movable member which automatically starts the positive latching sequence. In this way no separate devices, e.g., micro switches, synchronizing circuits or extra signalling means are required to initiate the positive latching operation.

The next feature to be described is the timing of the pressure resetting or relieving sequence. Assume now that the latching pressure has moved the power piston 41 all the way to the left in the drawing, i.e., the door is securely latched. By referring to FIG. 3 it will be seen that piston 47 in the servo valve portion 39 of the latch actuator, which up till now was blocking off ports 44 and 45 and conduit 61, due to the action of the spring 51, has now been pushed by rod 48, which is in contact with the power piston 41, all the way to the left. This uncovers ports 44 and 45 in both latch actuators which allows the high pressure fluid to flow through the actuators, and conduits 61, into conduit 62, and back to the pump to complete the flow path. Because of the size of the orifice 6, however, the pressure does not drop to zero, i.e., there is enough pressure to keep the fluid circulating so as to prevent hot spots in the system. The reduced pressure thus prevents wear and increases the life of the system parts. Bleeding or cooling flow passages 65 are also provided in the latch actuator power pistons 41 and the main actuator power pistons to further reduce wear by providing a return to the pump through conduit 59, the selector valve, and vent conduit 64, although this is not absolutely necessary.

With reduction of the control system pressure, it is obvious that some means is required to insure that the doors remain securely latched. Referring again first to the details of the latch mechanism shown in FIG. 3, it will be noted that in this position, the cam member dog 32 is in contact with the stop 33. This is due to the fact that as member 16 rotated in the clockwise direction during the latching sequence, the dog rotated also since it was fixed to the rotating crank. As the cam member rotates, point 34, to which the detent spring cylinder or toggle 35 is attached, also moves clockwise until it is above the center line of the rigid connecting link 18, as shown in the drawing. Therefore, the detent member pushes the cam member dog 32 against the stop and holds it there even though system pressure is reduced, or even removed. It will be clear that what has been provided is a novel overcenter linkage arrangement for securely holding the movable members in the latched position even though power from the control system be completely removed or accidently lost. In addition, power is only relieved when the doors are, in fact, securely latched in place since it will be noted from the drawings that the pressure relief signal through conduit 61 must pass through both latch actuators. For example, should one of the movable members be stopped in its travel towards the latched position, the power piston 41 will be prevented from moving far enough to the left to cause rod 48 to move servo piston 47 to uncover the relief ports 44 and 45 sufficiently to drop the pressure through the orifice 64. Thus, system pressure will remain high enough to cause the main actuators to continue pushing the movable members in the desired direction. The relationship of the pistons in the latch actuator is such that ports 44 and 45 will act as pressure maintaining orifices until the door stirrups are, in fact, securely gripped by the member 12 and the detent means has taken effect.

With the movable member 1 in a latched position, should it be desired to move the member to an unlatched position, the sequence is as follows: Movement of the manual control lever (not shown), preferably to reduce speed in case of a thrust reverser application, moves the selector valve piston 66 to the dotted line position shown in FIG. 1. This vents conduit 58 and connects the pump through conduit 59 to the rod ends of the main actuators and the head ends of the latch actuators, as shown by the dotted line arrows. Now the pressure which was maintained by orifice 6 has no effect on the latch actuator power setting. The pressure supplying means 7 is then connected to the rod ends of the main actuators and the head ends of the latch actuators. The main actuators are restrained from moving due to the latching mechanism restraining the doors. The application of pressure to the head end of the latch actuator causes the piston rod 27 to move to the right and move push rod 24, which in turn pushes on point 26 on the position translating member or crank 16 to move the crank in the counterclockwise direction. The force of the fluid pushing on the latch actuator being enough to overcome the detent action of the dashpot 35 causes dog 32 to lift off stop 33. Since the member 16 is now turning in the counterclockwise direction, connecting point 34 will also rotate in this direction. At the same time point 20, to which the rigid link 18 is attached, moves counterclockwise causing the member or catch 12 to rotate about fixed pivot 14 on the frame in a clockwise direction. As the catch 12 continues to move, stirrup 4 becomes disengaged from the lip 13 and the movable member is free to move out to the unlatched position. The final increment of travel of the latch actuator also causes the dog 29 on the cam member 28, which is rotating in the counterclockwise direction since it is attached to the crank 16, to contact stop 30. At the same time connecting point 34 on the crank will have moved around until it is now below pivot point 17 as seen in the drawing. Thus, catch 12 is held in the open position ready to receive the stirrup, on initiating of the next cycle, by the pressure of the detent means 35. At the same time, it will also be evident from the above description that as power piston 41 is moved to the right, the spring 51 in the servo valve portion of the latch actuator will cause piston 47 to move so as to cover the pressure relief ports 44 and 45. As described above, there is no provision for relieving the pressure in the control system in the thrust reverse position since it may be necessary to prevent vibration of the linkage, possibly through buffeting caused by the air blast, to keep high pressure on the main actuators. If desired, however, provision could be made for relieving system pressure in the thrust reverse position also.

An alternate arrangement of the control system and latch apparatus is shown in FIG. 4 in simplified form. Indicated generally at 75 and 76, respectively, are the movable member main actuators or motor means and the latch motor means or actuators. Conduit means 77 connects the head ends of the main actuators to the rod ends of the latch actuators through ports 78 in the latch actuators, which ports open into the latch actuator bores 80. A second conduit 82 connects the main actuator rod ends to the latch actuator head ends through ports 83 which also open into the actuator bores 80. One of the latch pistons is provided with a restricted passage 86, the other piston containing an annular passage 87. Cooling flow passages 90 may also be provided in the latch actuator pistons, as well as in the main actuator pistons. Also located in the head ends of the latch actuators are ports 92 which are used to supply a pressure resetting or power reducing signal to the main portion of the control system, through conduits 94 and 95, as described below. Included in the embodiment shown in FIG. 4 are the selector valve 9 and the pump 7 of FIG. 1, the fluid supply and drain, or return to the tank, not being shown.

The system operation is similar to that of the system of FIG. 1 in that the selector valve piston rod is connected to a manually operated control lever, such as a throttle, and movement of the rod causes the selector valve piston to move into the position shown in solid lines in the drawing. This connects high pressure fluid from the pump to the head ends of the main actuators and to the rod ends of the latch actuators through conduit 77. As in the previously described system, this causes the movable member to start to move towards the latched or engaged position. The latch mechanism is identical to that shown in FIGS. 2 and 3 and operates as described above, i.e., the latch actuator pistons 85 and 86 will be moved sufficiently to uncover the rod end orifices 78 which will cause the latch motor means to take over the latching sequence. Power is continued to be applied to the main and latch actuators until the doors are securely latched. At this point, the latch actuator pistons 85 and 86 will have moved to the position shown in the drawing, i.e., to the extreme left. This results in a flow path being established from the port 78 in the bottom latch actuator, in the drawing, through the restricted passage 86, out port 92 in the head end, through conduit 94, into the other actuator through the other port 92 and into the annular passage 87 which is now in line with the ports 92 in the upper latch actuator. Thus, a pressure reset signal is made available only when the latch pistons are lined up, i.e., when the latch mechanism has succeeded in securely latching both movable members and is capable of maintaining them in this position by reason of the detent arrangement described above.

The pressure reset or power reducing signal, in this embodiment, is conducted through conduit 95 to a pressure reset device or valve 96. Operation of the valve is as follows: pressure from line 95 causes piston 102 to move to the left, as shown in the drawing in solid lines. This allows the high pressure which had been applied to the main actuators through conduit 77 to pass out to drain through check valve 104, thus reducing the pressure on the main motor means. Bleed orifice 105 is used to maintain the cooling flow in connection with the latch actuator piston cooling passages 90 and a complete path through the selector valve to cool fluid in the main actuators is accomplished through the main actuator cooling passage, conduit 106, and the selector valve to drain.

If it is decided to unlatch the movable member, the sequence is as follows: Movement of the manual control (usually to reduce speed in the case of a thrust reverser application) moves the selector valve piston rod to the left in the drawing, i.e., into the dotted line position, which exposes conduit 106 to pressure from the pump which momentarily rises since the piston is now blocking off conduit 77. This pressure is applied to the rod ends of the main actuators and the head ends of the latch actuators. As described above, both pairs of actuators are arranged so that the latch actuators will unlatch the doors before the main actuators are free to move. Therefore, as before, pressure on the head end of the latch actuator pistons 85 and 96 move the pistons to the right in the drawing, causing the latch mechanism catch members 12 to become disengaged from the stirrups 4. It will be noted from the drawing that as the piston moves to the right the pressure reset orifices 92 will be blocked momentarily. After the pistons have moved over sufficiently the rod end will be closed and the system is readied for recycling.

The latch mechanism will be maintained in the movable member receiving position by means of the detent action descirbed above. Circulation of cooling flow will now be through conduit 82, and cooling passages 90, through conduit 109 back to drain.

Other modifications and alternatives of the novel control system herein above described as will be obvious to those skilled in the art and which are within the scope and spirit of our invention are also intended to be covered by the appended claims.

We claim:

1. A position control system for positioning and retaining a movable load member, comprising first hydraulic motor means including a movable drive member operable to drive said movable load member in at least one direction of travel thereof, locking mechanism adapted to be engaged by one of said movable members on reaching an extreme of its travel and including lock means operable to lock said member at said travel extreme by movement of said lock means from a first position in which said movable member is not locked to a second position in which said movable member is locked, said locking mechanism further including second hydraulic motor means having a drive element connected to said lock means and movable between first and second positions corresponding to said first and second positions of said lock means, said second hydraulic motor means being operable to effect movement of said lock means into said second position and including means disabling said second hydraulic motor means when said lock means is in said first position and enabling operation only after said lock means has departed from said first position and is in transit toward said second position, said locking mechanism further including means operative on engagement with said one movable member on arrival thereof at said one extreme of travel to cause movement of the drive member of said second hydraulic motor means away from said first position to thus enable said second hydraulic motor means to become operative to drive said lock means on to said second position thereof, hydraulic pressure fluid supply means operatively connected to said first and second hydraulic motor means, and valve means operable by said second motor means on reaching said second position thereof to reduce the pressure level of said hydraulic fluid supply means.

2. A position control system for positioning and retaining a movable load member, comprising first motor means including a movable drive member operable to drive said movable load member in at least one direction of travel thereof, locking mechanism adapted to be engaged by one of said movable members on reaching an extreme of its travel and including lock means operable to lock said member at said travel extreme by movement of said lock means from a first position in which said member is not locked to a second position in which said member is locked, said locking mechanism further including second motor means having relatively movable hydraulic cylinder and piston elements with one of said elements being drivingly connected to said lock means and movable between first and second positions corresponding to said first and second positions of said lock means, said second motor means further including hydraulic supply ports into said cylinder adjacent the ends thereof at points such that one such supply port is blocked by said piston element when the motor elements occupy said first position whereby said second motor means is disabled in said first position and can become operative only after said motor elements have departed from said first position and are in transit toward said second position, said locking mechanism further including means operative on engagement with said one movable member on arrival thereof at said extreme of travel to cause movement of said second motor means for initiating movement thereof from said first position toward said second position to thus enable said second motor means to become operative to drive said lock means into said second position thereof.

3. A position control system for positioning and retaining a multi-element load requiring synchronized movement of the several elements of the load, comprising a plurality of first hydraulic motor means each connected to one of said load elements for moving the same between a first and second position, a plurality of latch mechanisms operable to restrain said load elements in said first position and each including a load element engaging member, a plurality of second hydraulic motor means each connected to drive one of said latch mechanisms, each of said second motor means becoming operable responsive to a signal received from said mechanism as a result of said engaging member being engaged by a load element, hydraulic pressure fluid supply means operatively connected to said first and second motor means for selective operation thereof, a plurality of series connected valve means each operable by one of said second hydraulic motor means and connected to reduce the pressure level of said fluid supply means only when all said load elements are positively restrained by said latch mechanisms in said first position.

References Cited in the file of this patent

UNITED STATES PATENTS

| | | |
|---|---|---|
| 2,576,554 | Ashton | Nov. 27, 1951 |
| 2,780,057 | Stavert | Feb. 5, 1957 |
| 2,811,136 | Westcott et al. | Oct. 29, 1957 |
| 2,866,315 | Schakel | Dec. 30, 1958 |

FOREIGN PATENTS

| | | |
|---|---|---|
| 619,987 | Great Britain | May 27, 1953 |